United States Patent [19]
Hartmann et al.

[11] Patent Number: 4,463,478
[45] Date of Patent: Aug. 7, 1984

[54] DEVICE FOR SHIFTING FISH INTO POSITION FOR DECAPITATING

[75] Inventors: Franz Hartmann, Bad Oldesloe; Gottfried Heinen, Neversdorf, both of Fed. Rep. of Germany

[73] Assignee: Nordischer Maschinenbau Rud. Baader GmbH & Co KG, Lubeck, Fed. Rep. of Germany

[21] Appl. No.: 391,129

[22] Filed: Jun. 23, 1982

[30] Foreign Application Priority Data

Jun. 27, 1981 [DE] Fed. Rep. of Germany ....... 3125412

[51] Int. Cl.³ ............................................. A22C 25/14
[52] U.S. Cl. ........................................... 17/63; 17/54
[58] Field of Search .................... 17/54, 63, 57, 58, 56

[56] References Cited
U.S. PATENT DOCUMENTS

| 2,245,330 | 6/1941 | Danielsson | 17/54 |
| 4,025,988 | 5/1977 | Hartmann | 17/54 X |
| 4,291,435 | 9/1981 | Hartmann | 17/54 X |

FOREIGN PATENT DOCUMENTS

| 659123 | 4/1979 | U.S.S.R. | 17/54 |
| 659126 | 4/1979 | U.S.S.R. | 17/54 |
| 759843 | 8/1980 | U.S.S.R. | 17/54 |

Primary Examiner—Willie G. Abercrombie
Attorney, Agent, or Firm—Edward F. Levy

[57] ABSTRACT

A device for positioning of fish into their correct position for decapitating is disclosed. This device is applicable in fish-processing machines in which the fish lying transverse to their longitudinal extension in receiving troughs of a chain of troughs are fed to a decapitating tool. To this end, a shifting device comprises a shifting element engaging the snout of the fish and being activated and positioned dependent on the detection of the thickness of the fish in the region of its head. A feeler is coupled to a position sensor which emits measuring signals dependent on the position via a control circuit to control a stepping motor which drives the shifting element.

6 Claims, 6 Drawing Figures

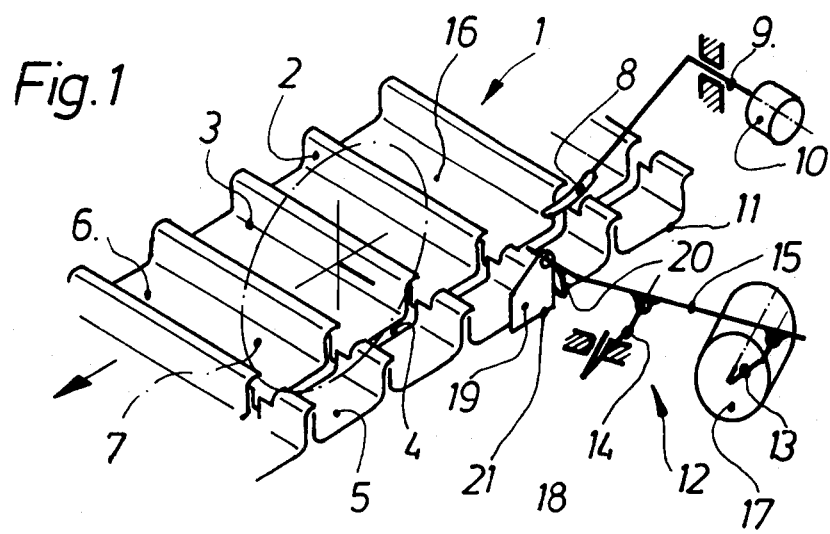
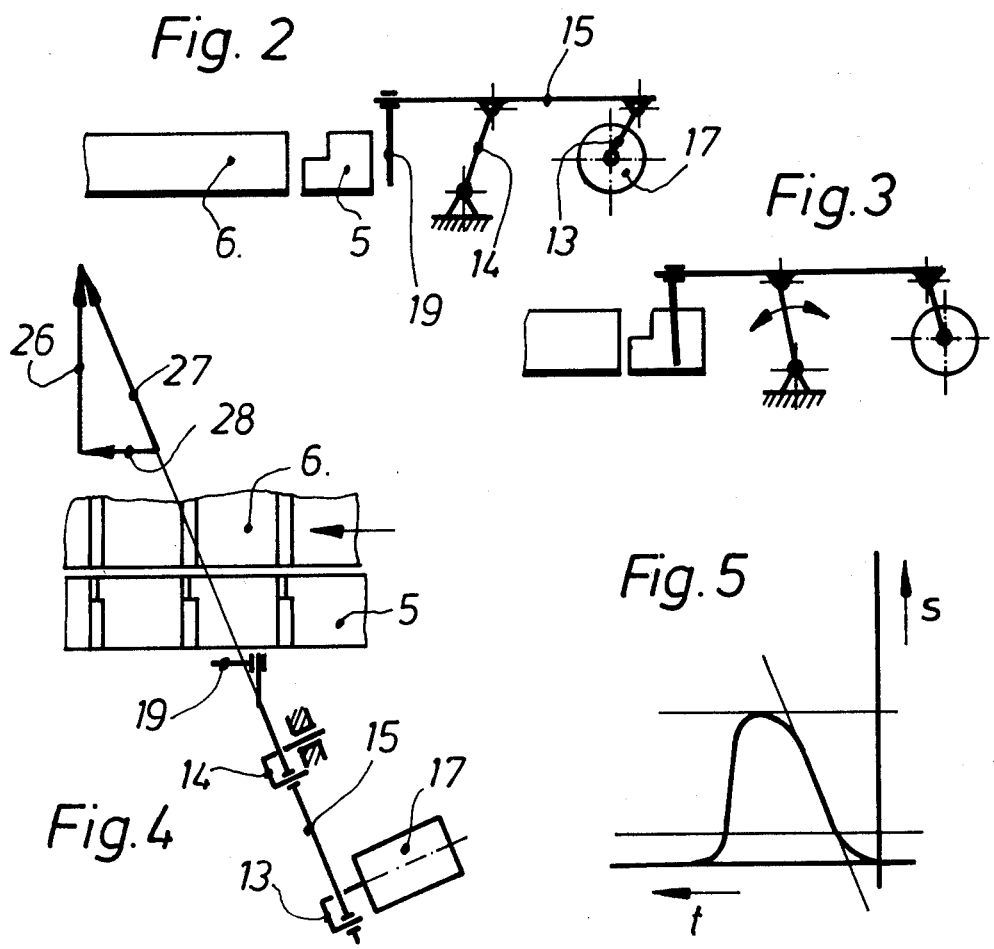

DEVICE FOR SHIFTING FISH INTO POSITION FOR DECAPITATING

BACKGROUND OF THE INVENTION

1. Field of the Invention

The invention concerns a device for shifting fish into a predetermined position for decapitating depending on the size of each fish, which fish are lying in receiving troughs having lateral conveying shoulders to convey the fish in a position essentially perpendicular to their longitudinal axes into a desired decapitating position, the device comprising at least one shifting element associated to the conveyor, this shifting element engaging the snout of each fish in a manner timed with the movement of the trough conveyor and accompanying the fish at least during the shifting procedure.

2. Description of Prior Art

In a known structure of this type (see French Pat. No. 852 242) a device is used in which a feeler plate is arranged above the fish path which is formed by a chain of receiving troughs, which plate is lowered onto the fish according to the timing of the troughs passing beneath the plate. The feeler plate is connected to a shifter engaging the snout of the fish to push it via a lever mechanism, the position of the shifter being adjusted depending upon the thickness of the fish which is decided by the feeler plate, each fish thus being shifted into the desired position for economical decapitating.

The plurality of coupling joints and transfer elements as well as the necessity of converting the size into a shifting path of multiple length produces on the one hand a lack of precision in the positioning and limits on the other the efficiency of the device to a rhythmic succession which by far no longer meets the demands of today.

3. Object of the Invention

It is therefore a main and essential object of the invention to suggest a construction which is able to bring the fish precisely into their individual decapitating position even at high production rates.

BRIEF SUMMARY OF THE INVENTION

According to the invention this object is achieved by using a device for shifting fish into their decapitating position, which device is associated to a conveyor having receiving troughs in which the fish are lying and lateral conveying shoulders to convey the fish in a position essentially perpendicular to their longitudinal axes and which device comprises at least one shifting element associated to the conveyor, this shifting element engaging the snout of each fish in a manner timed with the movement of the trough conveyor and accompanying the fish at least during the shifting procedure in which device a feeler is provided which is displaceable by the fish and is coupled with a position sensor, and the shifting element is driven by a stepping motor which is controlled by the signals from the feeler which are converted resp. processed by a controlling device.

The advantages thus achieved particularly reside in that a positioning of the fish dependent on their individual size is made possible with little expenditure in mechanical elements, and which despite high shifting or displacement speeds can be accomplished with great precision which is of benefit to the yield of valuable fish flesh.

In a preferred embodiment of the device according to the invention the feelers is provided as a pivoting feeler and the position sensor as a swivelling pulse generator.

In order to lead the shifting element along the conveying or entraining shoulders of the receiving troughs advancing at the conveying speed the shifting element may be carried by a pusher rod guided approximately parallel to a bottom wall of the receiving troughs and at such an angle to the conveying direction thereof that the vector representative formed by the speed vector of the advance speed of the pusher rod after the starting period and the vector of the progress speed of the trough conveyor runs in the direction of the conveying shoulder of the receiving troughs.

The controlling device may comprise a permanently stored sequence programme for a starting phase and a stopping phase of the stepping motor while a total step sequence determining the shifting and return movement of the shifting element is set individually by and according to the respective displacement of the feeler by the fish to be processed via the position sensor.

In this connection it is expedient if the average advance speed of the shifting element is smaller than its return speed. In this way it is possible to achieve an optimal course of motion of the shifting element so that despite a high timing or clock rate a compression of the fish on the one hand and a throwing effect on the other can be essentially avoided and therefore an exact positioning can be reached.

According to another embodiment the operational surface of the shifting element when it is at rest is at such a distance from the front face of the receiving troughs that the shifting element enters between the conveying shoulders only upon completion of the starting period of the stepping motor. Thus the shifting element only enters the area of the conveying troughs after acceleration has taken place or after reaching the phase of constant speed, so that an exact guiding of the shifting element along the advancing conveying shoulder is made possible.

BRIEF DESCRIPTION OF THE DRAWINGS

Other and further objects of the present invention will be apparent from the following description and claims and are illustrated in the accompanying schematic drawings, which, by way of illustration, show a preferred embodiment of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the drawings

FIG. 1 is a simplified partial axonometrical view of the total device,

FIG. 2 is a side view of the shifting device at rest in relation to the trough conveyor, FIG. 3 is a side view of the shifting device according to FIG. 2 in an advanced position, FIG. 4 is a partial top view of the shifting device with a vector representation of the speed relationship in the accelerated moving phase of the shifting element, FIG. 5 is the time-travel diagram for the course of motion of the shifting element during one cycle.

DETAILED DESCRIPTION OF THE PREFERRED EMBODIMENT

Figure 6:
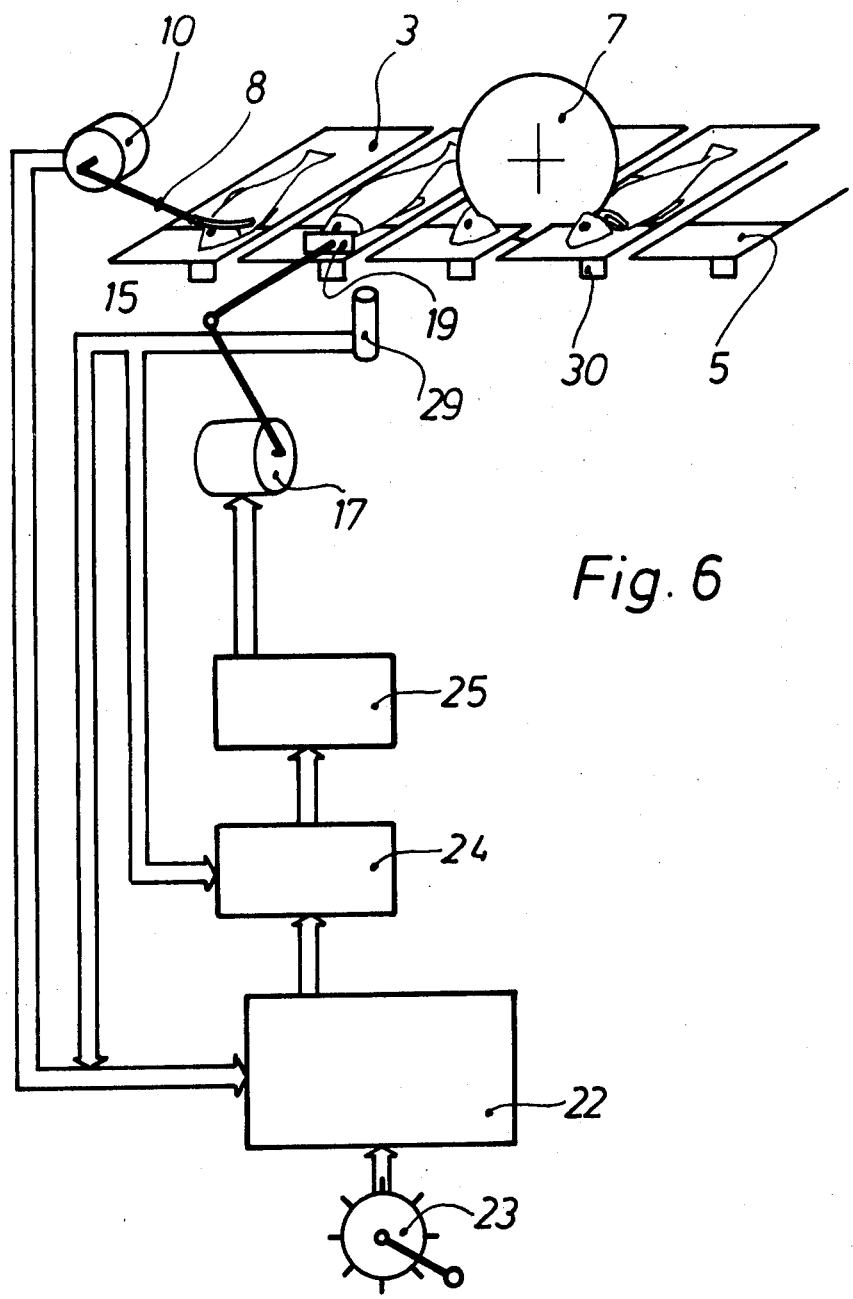
FIG. 6 is a block diagram representing the controlling of the shifting device.

In a not-shown frame of a fish decapitating machine an only partially shown endless trough conveyor 1 comprising a chain of receiving troughs 3 arranged transverse to the conveying direction of the conveyor 1 and each having a conveying shoulder 2 is provided. The receiving troughs 3 are separated at about a quarter of their lengths by a slot or gap 4 which parts each receiving trough 3 into a head trough 5 for receiving the head of the fish, and a body trough 6 for supporting the trunk of the fish. The slot 4 forms a space for a circular decapitating knife 7 which is mounted above the trough conveyor 1 and is driven to rotate, as well as for a feeler 8 which is mounted to pivot about a horizontal axis 9 above the receiving troughs 3 and is coupled with a position sensor 10. The latter can be formed as a measuring element which produces a digital or analog signal, respective controlling devices for effecting the processing resp. conversion of the signal into a form appropriate for controlling a stepping motor 17 being connectable downstream in a suitable manner.

A shifting device 12 for the fish is provided in fixed arrangement with the frame and opposite the front face 11 of the head trough 5. The shifting device 12 comprises a pusher rod 15 which is mounted pivotably on two levers 13 and 14, the pusher rod 15 being aligned almost parallel to a bottom wall 16 of the receiving troughs 3 and, in its longitudinal extent pointing to the receiving troughs 3 being inclined in the conveying direction. The rear one of the levers, i.e. lever 13, is mounted as a crank arm on a shaft of the stepping motor 17, while the front lever 14 is mounted with its support bearing 18 in the machine frame. The free end of the pusher rod 15 pointing towards the trough conveyor 1 forms an angle and runs parallel to the conveying shoulder 2 of the receiving troughs 3. It carries a shifting element 19 mounted pivotably around the pusher rod 15, the element being held in alignment by an abutment or stop 20 so that its lower edge 21 runs parallel to and at a small distance above the level of the bottom wall 16 of the receiving troughs 3.

The method of operation of the device is as follows:

The fish to be processed are inserted into the receiving troughs 3 with their snouts pushed against a not-shown abutment rail adjacent to the head troughs 5. When being transported in the direction of the decapitating knife 7 each fish runs under the feeler 8 which effects an adjustment of the position sensor 10 coupled therewith corresponding to the thickness of the fish. The signals thereby emitted are fed to a computer 22. This comprises a preset programme which orientates itself to constants specific for the machine structure as well as to values specific for the fish, i.e. variable values, and detects a number of steps for the stepping motor 17 representing the necessary displacement path of the respective fish, taking the thickness measuring value into account. Since the relationship of the length of decapitation to the measured thickness of the head—preferably the area between the eyes and gill covers—is different depending on the type or species of fish, a selector switch 23 is provided, with the help of which a corresponding change is possible.

The computer 22 is connected upstream of the fixed programme control device 24 whose exit is connected to the stepping motor 17 by an output part 25. The data flowing into the control device 24 lead according to the fixed programme of the control device to the supply of a sequence of pulses modified as regards their chronological order to the output part 25. The characteristic of this order is that the advance of the shifting element 19, when considered over one cycle, is divided into three parts (see also FIG. 5):

1. The starting period or phase comprising a constant number of steps in which the amount of time between the sequence of pulses is reduced exponentially to a set minimum corresponding to a highest possible shifting speed;
2. A stopping phase or period also comprising a constant number of steps, which phase basically represents a reversion of the starting phase in its course and is so designed that the shifting element 19 reaches its resting position after the total number of steps detected by the computer 22 have been carried out;
3. A period or phase of a constant sequence of pulses into which the starting period merges and which is followed by the stopping period, this constant sequence period running at such a speed that the shifting element moves in one direction which corresponds to that of the vector representative 26 formed by the speed vector 27 of the advance speed of the pusher rod 15 and the speed vector 28 of the progression of the trough conveyor 1 (see FIG. 4). The motion of the shifting element 19 occurs in a like fashion, but more quickly. The timing of the controlling occurs by means of a proximity switch 29 which works without contact and which is activated through switch tappets 30 arranged on the troughs 3 following the rhythm of the passing receiving troughs 3.

With the help of the device according to the invention it is possible to control other processing operations following the decapitating process by using the thickness measuring results (of the fish) obtained in the form of a sequence of pulses with corresponding modification as a value for controlling the timely operation of tools as well as the course of their function.

What is claimed is:

1. A device for shifting fish into a predetermined position for decapitating depending on the size of each fish, said fish having a head with a snout and a body together defining a longitudinal fish axis, and being conveyed by receiving troughs forming part of conveying means and running in a conveying direction, said receiving troughs being arranged to receive said fish in a position with said longitudinal fish axis essentially perpendicular to said conveying direction and having at least a bottom wall, a front face and lateral conveying shoulder means, said device comprising shifting means engaging said fish in a timed manner according to the conveying rate of said troughs and defining a shifting path, feeler means adapted to be displaced by said fish for detecting a value of the size of said fish, and means coupled with said feeler means for limiting the length of said shifting path according to the detected value of the size of said fish, wherein said device further comprises a. a shifting element driven by said shifting means and having an operational face engaging said fish by its snout to shift it in a backward direction into said predetermined position, said shifting element being moved along said shifting path in such a direction and at such a rate as to accompany the fish in its conveyed movement at least during the shifting thereof, b. stepping motor means for driving said shifting means, and c. control device means for controlling said stepping motor means by processing signals produced through and received from said feeler means.

2. A device as claimed in claim 1, wherein said shifting means further comprises pusher rod means to carry said shifting element, said pusher rod means being guided approximately parallel to said bottom wall of said receiving troughs and at such an angle to said conveying direction thereof that a vector representative formed by the speed vector of the advance speed of said pusher rod means and the vector of the progress speed of said conveying means is directed in the direction of said conveying shoulder means.

3. A device as claimed in claim 2, wherein said control device means are provided with a permanently stored step sequence programme for a starting phase and a stopping phase of said stepping motor means, while a total step sequence determining the shifting and the return movement of said shifting means is set individually by and according to the respective displacement of said feeler means by said fish to be processed via said position sensing means.

4. A device as claimed in claim 3, wherein the average advance speed of said shifting means is smaller than the return speed thereof.

5. A device as claimed in claim 3, wherein said shifting element with said operational face in a rest position defines a distance to said front face of said receiving troughs such that said shifting element enters between said conveying shoulders only upon completion of said starting phase.

6. A device as claimed in claim 2, wherein said shifting element is coupled with said pusher rod means in a manner to be displaceable by said conveying shoulder means of said receiving troughs.

* * * * *